United States Patent
Reuvekamp et al.

(10) Patent No.: US 8,999,101 B2
(45) Date of Patent: Apr. 7, 2015

(54) METHOD FOR MUTUALLY ADHERING MOULDED ARTICLES OF VULCANIZED RUBBER

(75) Inventors: Louis-Philippe Antoine Eugène Maria Reuvekamp, Enschede (NL); Gerard Nijman, Losser (NL); Petrus Johannes Van Swaaij, Enschede (NL)

(73) Assignee: Apollo Vredestein B.V., Enschede (NL)

( * ) Notice: Subject to any disclaimer, the term of this patent is extended or adjusted under 35 U.S.C. 154(b) by 675 days.

(21) Appl. No.: 12/516,041

(22) PCT Filed: Nov. 23, 2007

(86) PCT No.: PCT/NL2007/050588
§ 371 (c)(1),
(2), (4) Date: Nov. 11, 2009

(87) PCT Pub. No.: WO2008/063067
PCT Pub. Date: May 29, 2008

(65) Prior Publication Data
US 2010/0052362 A1    Mar. 4, 2010

(30) Foreign Application Priority Data

Nov. 23, 2006  (NL) .................................. 2000328

(51) Int. Cl.
*B29C 65/00*  (2006.01)
*B29C 65/02*  (2006.01)
(Continued)

(52) U.S. Cl.
CPC ........... *B29C 65/02* (2013.01); *Y10T 156/1092* (2015.01); *Y10T 428/265* (2015.01);
(Continued)

(58) Field of Classification Search
CPC  B29C 65/002; B29C 65/4835; B62D 35/005; B62D 35/007; B62D 35/008
USPC ................ 156/306.6, 307.1, 313, 338, 306.9, 156/307.7; 296/180.1, 180.5
See application file for complete search history.

(56) References Cited

U.S. PATENT DOCUMENTS 2,304,263 A * 12/1942 Luty .............................. 428/140
2,829,915 A *  4/1958 Claveau ........................ 293/109
(Continued)

FOREIGN PATENT DOCUMENTS

EP          518194 A1 * 12/1992
EP         1 061 097      12/2000
(Continued)

OTHER PUBLICATIONS

International Search Report from related International Application No. PCT/NL2007/050586 mailed Feb. 28, 2008.
(Continued)

*Primary Examiner* — John Goff
(74) *Attorney, Agent, or Firm* — Renner, Otto, Boisselle & Sklar, LLP

(57) ABSTRACT

The invention relates to a method for mutually adhering molded articles of at least partially vulcanized rubber polymers. The method comprises at least the steps of providing a rubber composition which comprises a peroxide with an initiating temperature lower than the vulcanization temperature of at least one of the rubber polymers; arranging an adhesive layer of the rubber composition on the surface of the molded articles which is to be adhered; bringing the surfaces for adhering together under pressure; and vulcanizing at least the adhesive layer at an increased temperature.

13 Claims, 1 Drawing Sheet

(51) Int. Cl.
  *B29C 65/48*   (2006.01)
  *C08J 5/12*   (2006.01)
  *B62D 35/00*   (2006.01)
  *B29K 21/00*   (2006.01)
  *B29L 31/30*   (2006.01)
  *B29L 31/00*   (2006.01)
  *C08L 19/00*   (2006.01)
  *C08L 21/00*   (2006.01)
  *C08L 23/16*   (2006.01)

(52) U.S. Cl.
  CPC ......... *Y10T428/264* (2015.01); *B29C 65/4835* (2013.01); *B29C 66/71* (2013.01); *B29K 2021/00* (2013.01); *B29L 2031/3044* (2013.01); *B29L 2031/3058* (2013.01); *B29L 2031/721* (2013.01); *C08J 5/128* (2013.01); *C08J 2323/16* (2013.01); *C08L 19/00* (2013.01); *C08L 21/00* (2013.01); *C08L 23/16* (2013.01); *B62D 35/005* (2013.01)

(56) References Cited

U.S. PATENT DOCUMENTS

| | | | | |
|---|---|---|---|---|
| 3,344,105 A | * | 9/1967 | McDonel et al. | 524/525 |
| 3,708,379 A | * | 1/1973 | Flint | 428/58 |
| 4,129,542 A | * | 12/1978 | Matheson et al. | 524/70 |
| 4,379,114 A | * | 4/1983 | Fujiki et al. | 264/248 |
| 4,431,775 A | * | 2/1984 | Maeda et al. | 525/193 |
| 4,517,146 A | * | 5/1985 | Takasu et al. | 264/40.6 |
| 5,382,070 A | * | 1/1995 | Turner | 296/180.1 |
| 5,594,052 A | * | 1/1997 | D'Sidocky et al. | 524/83 |
| 6,279,633 B1 | | 8/2001 | Corvasce | |
| 6,765,045 B1 | | 7/2004 | Daniel et al. | |
| 2004/0175527 A1 | * | 9/2004 | Shiota et al. | 428/43 |
| 2005/0017541 A1 | | 1/2005 | Jungert | |

FOREIGN PATENT DOCUMENTS

| | | |
|---|---|---|
| EP | 1 072 442 | 1/2001 |
| FR | 2 454 899 | 11/1980 |
| JP | 07 096562 | 4/1995 |
| NL | 6 613 607 | 3/1967 |
| WO | 2005/105854 | 11/2005 |
| WO | 2008/063065 | 5/2008 |
| WO | 2008/063066 | 5/2008 |

OTHER PUBLICATIONS

International Preliminary Report on Patentability from related International Application No. PCT/NL2007/050586 mailed Feb. 20, 2009.
International Search Report from related International Application No. PCT/NL2007/050587 mailed Feb. 26, 2008.
International Preliminary Report on Patentability from related International Application No. PCT/NL2007/050587 mailed Mar. 3, 2009.
International Search Report from corresponding International Application No. PCT/NL2007/050588 mailed Feb. 21, 2008.
International Preliminary Report on Patentability from corresponding International Application No. PCT/NL2007/050588 mailed Jan. 20, 2009.

* cited by examiner

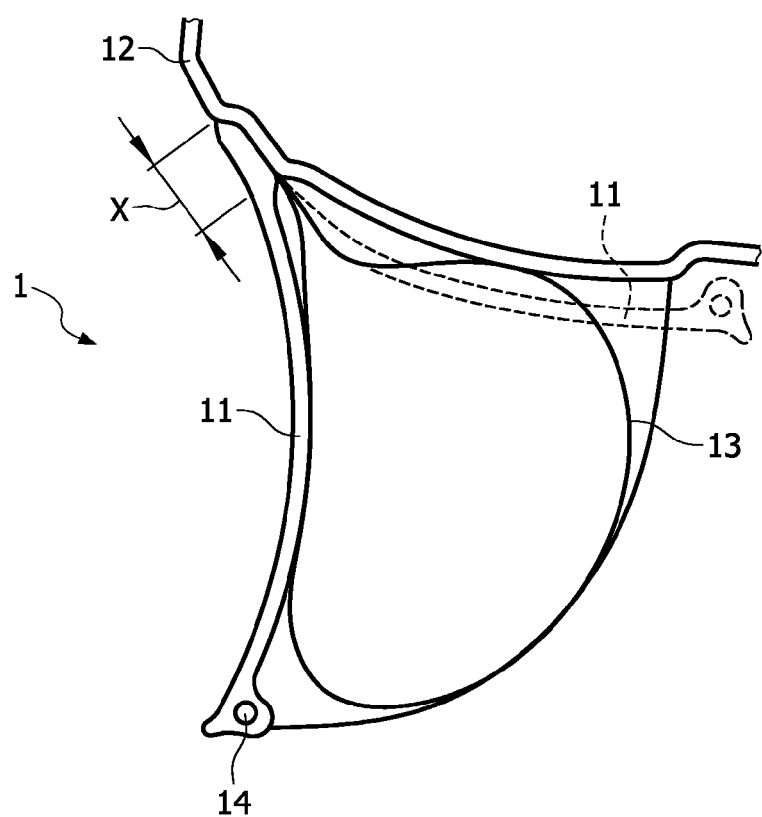

METHOD FOR MUTUALLY ADHERING MOULDED ARTICLES OF VULCANIZED RUBBER

This application is a national phase of International Application No. PCT/NL2007/050588 filed Nov. 23, 2007 and published in the English language, and claims priority to NL 2000328 filed Nov. 23, 2006.

The invention relates to a method for mutually adhering moulded articles of at least partially vulcanized rubber polymers.

Moulded articles of rubber polymer are often assembled from multiple components. This can for instance be the case for moulded articles of relatively complex form. This is because it is not always possible to form and vulcanize such a moulded article in a mould in one operation, for instance because the shape thereof makes mould undercuts necessary, whereby the moulded article cannot be removed in simple manner from the mould.

In the manufacture of such an assembled moulded article it is important that the components have a good mutual adhesion. In addition, the typical properties of rubber polymers must not be lost when the two components are mutually connected. Particular properties must be retained, such as a low modulus of elasticity, low hardness, high elongation at break and thereby a high tensile strength, the highly elastic behaviour with a relatively low permanent set, and a relatively high independence from and resistance to temperatures, also in the assembled moulded article.

In a prior art method for manufacturing an assembled moulded article from multiple moulded articles, a plurality of rubber polymers is brought together in a vulcanizing mould in unvulcanized state and then vulcanized together. Before a rubber polymer begins to vulcanize it must first be brought to a temperature suitable for the purpose. Because of the rise in temperature the viscosity of the rubber polymer decreases, whereby it may begin to flow under pressure. If two rubber polymers are arranged together in a vulcanizing mould and subsequently vulcanized, the two rubber polymers will generally flow into each other at the position of their boundary surface, whereby the boundary surface between the two is not well defined. This drawback of the known method can for instance be seen in cycle tyres which are provided on the tread with a strip differing from the black colour and running in peripheral direction of the tyre. The dividing line between the strip and the rest of the tyre generally has a random waviness. This is unacceptable for moulded articles for which high aesthetic standards are set. A further drawback of the known method is that it is not possible to mutually connect moulded articles where a material is applied in at least one which is not temperature-resistant at the vulcanization temperature. Degradation will possibly hereby occur in this constituent moulded article, and this is undesirable.

In another known method the constituent moulded articles are first manufactured and vulcanized separately, after which they are adhered to form the assembled moulded article. Although this has the advantage that a good adhesion between the constituent moulded articles is obtained, the adhesion of a plurality of already vulcanized moulded articles results in an assembled moulded article with properties which can differ significantly from that which may be expected from rubber polymers. The adhesive applied in the boundary surface is generally more brittle and/or has a hardness and/or modulus of elasticity differing from the rubber polymers.

The present invention has for its object to provide a method according to the preamble, wherein the above stated drawbacks of the known method are at least partly obviated.

This objective is achieved according to the invention by a method for the mutual adhesion of moulded articles of at least partially vulcanized rubber polymers, which method comprises at least the steps of (A) providing a rubber composition which comprises a peroxide with an initiating temperature lower than the vulcanization temperature of at least one of the rubber polymers; (B) arranging an adhesive layer of the rubber composition on the surface of the moulded articles which is to be adhered; (C) bringing the surfaces for adhering together under pressure; and (D) vulcanizing at least the adhesive layer at an increased temperature. An assembled moulded article is hereby obtained with substantially the same properties as the constituent moulded articles manufactured from rubber polymer. This has particularly great advantages for assembled moulded articles which regularly undergo rubber-elastic deformation during use. An improved adhesion between the constituent moulded articles is moreover obtained in the invented method by arranging at least one adhesive layer of a rubber composition which comprises a peroxide with an initiating temperature lower than the vulcanization temperature of at least one of the rubber polymers. In addition, it has also been found that assembled moulded articles obtained by means of the method display an improved fatigue behaviour compared to the moulded articles obtained in known manner. This is particularly the case for the connection between the constituent moulded articles. An additional advantage of the method according to the invention is that it also allows the connection of moulded articles of a material with a relatively low melting or degradation temperature to the moulded articles of rubber polymer.

According to the invention the rubber composition of the adhesive layer can for instance be arranged in a vulcanizing mould in at least partially vulcanized state. This is understood to mean that the rubber composition is sufficiently reactive to vulcanize together with the rubber polymers at the position of the boundary surface with the constituent moulded articles to form substantially one network. It has been found that a method wherein the rubber composition comprises a rubber polymer of which the main chain comprises a maximum of one unsaturated carbon/carbon bond per 200 carbon-carbon bonds produces a good adhesion between the constituent moulded articles. More preferred is a method wherein the rubber composition comprises a rubber polymer of which the main chain comprises a maximum of one unsaturated carbon/carbon bond per 50 carbon/carbon bonds. Most preferred is a method in which the rubber composition of the adhesive layer is substantially unvulcanized prior to step D). If desired, the rubber polymers of the constituent moulded articles can also be in at least partially vulcanized state. Preferably however, the method according to the invention is characterized in that at least one, and more preferably all rubber polymers are almost fully vulcanized.

It has further been found that the advantages of the invention are particularly manifest when the method has the feature that the rubber composition of the adhesive layer is substantially free of soot. In this preferred variant of the method a high level of adhesion is achieved without this detracting from the rubber-elastic properties of the assembled moulded article.

It is further advantageous when the surfaces for adhesion of the constituent moulded articles are pretreated. This can in principle take place in all ways known to the skilled person. It is thus possible to roughen, sand, degrease, provide the surfaces with a primer or other pretreating agent and/or provide the surfaces with radicals. This latter can for instance take place by irradiating the surfaces with radiation of suitable wavelength, for instance UV light, if desired laser radiation. It is also possible to subject the surfaces to a plasma treatment.

By arranging on the surfaces for adhesion of the constituent moulded articles a rubber composition according to the invention which comprises a peroxide with an initiating temperature lower than the vulcanization temperature of at least one of the rubber polymers, the rubber composition will vulcanize at the position of the boundary surface at lower temperature than the relevant rubber polymer situated elsewhere in the mould cavity. It also becomes possible in this manner to mutually adhere moulded articles of rubber polymers at low temperatures, and even at room temperature. This provides great advantages, for instance because degradation of constituent moulded articles is thus prevented and/or because costly heating equipment is no longer necessary and/or because the assembled moulded article can be manufactured at any desired location. The initiating temperature of a peroxide can be easily determined and is indicated by the supplier of the peroxide. The rubber composition preferably comprises a peroxide with an initiating temperature at least 20° C. lower than the vulcanization temperature of at least one of the rubber polymers, and more preferably at least 50° C. lower. The invention is not limited to the use of specific peroxides, but comprises in principle any peroxide suitable for the relevant rubber composition. The invention also comprises alternatives to peroxides. The peroxides can thus be chosen such that the vulcanizing of the rubber composition can take place at any temperature. It is advantageous to characterize the method in that step D) is performed at a temperature lower than 140° C., preferably lower than 110° C., more preferably lower than 90° C. and most preferably lower than 70° C.

A particularly advantageous preferred embodiment of the method according to the invention is characterized in that it comprises the additional steps of providing a film and, prior to step C), arranging at least a part of the film between the two surfaces to be adhered, with the proviso that the temperature in step D) is lower than the melting or degradation temperature of the film. In this preferred variant the rubber composition preferably comprises a peroxide with an initiating temperature lower than the melting or degradation temperature of the film, preferably at least 20° C. lower and most preferably at least 50° C. lower. On the basis of this preferred variant it becomes possible in simple and durable manner to connect at least parts of a film to a moulded article of rubber polymer. A possible application herefor comprises actuators which make use of an inflatable bellows of film. Such actuators must of course be and remain airtight during their lifespan. This also sets high standards for the connection. It has been found that the method according to the invention results in a connection of the inflatable bellows to a substructure which is permanently airtight.

The strength of the adhesive layer arranged between the constituent moulded articles is further improved by a method in which the film is provided with perforations prior to step C). Although not essential, it is also advantageous that the method is characterized in that the film is provided with an adhesive layer of the rubber composition.

All films known to the skilled person can in principle be applied in the method according to the invention. It is thus possible to apply metallic films. The film preferably comprises a plastic film, wherein the plastic is chosen from the group of the polyesters, polyethers, polyamides, vinyl polymers, polyolefins, styrene polymers and/or thermoplastic rubbers, in particular thermoplastic polyurethane. Such films are particularly suitable in respect of their properties for connection to rubber polymers. Due to their relatively low melting or degradation temperature however, there has been no suitable method available to bring about such a connection. The method according to the invention provides a solution here.

The rubber composition as applied in the method according to the invention can be prepared in a manner known to the skilled person. Any known method of mixing polymers, fillers and other additives is in principle suitable for this purpose. It is thus possible to mix the rubber composition, optionally supplemented with additives and/or other polymers if desired, using an internal mixer or Banbury mixer, a single or double-screw extruder apparatus, a blade kneader, a Buss Co-kneader, a roller and the like. Suitable temperatures during mixing are substantially determined by the rheological properties of the relevant rubber polymer.

The rubber polymers preferably applied in the rubber composition in the method according to the invention can be selected from the known rubbers. In general these rubbers have a glass transition temperature Tg lower than −10 EC, although this is not essential. Rubbers suitable for application are for instance chosen from the group of natural rubbers, isoprene rubbers, butadiene rubbers, styrene butadiene copolymer rubbers, acrylonitrile butadiene copolymer rubbers, if desired copolymerized with styrene, butadiene isoprene copolymer rubbers, chloroprene rubbers, butyl and acryl rubbers, and ethylene-propylene copolymers which, if desired, comprise a third copolymerizable diene monomer such as for instance 1,4-hexadiene, dicyclopentadiene, dicyclooctadiene, methylene norbornene, ethylidene norbornene and tetrahydroindene. If desired, the rubber composition also comprises a minor quantity of natural rubber and/or elastomer, which is preferably composed of 1,3-diene compounds such as for instance butadiene and/or isoprene and/or 2,3-dimethyl butadiene. The rubber composition applied in the method preferably comprises an ethylene-propylene rubber, and the applied rubber composition more preferably comprises an ethylene-propylene-diene rubber (EPDM). Mixtures of said rubber polymers are likewise possible.

If desired, additives can be added to the rubber composition as applied in the method according to the invention. Examples of usual additives are stabilizers, antioxidants, lubricants, fillers, dyes, pigments, flame retardants, conductive fibres and reinforcing fibres. The rubber composition can particularly also comprise an oil as additive. It is also possible to add petroleum plasticizers. Dyes suitable for the rubber composition comprise any type known to the skilled person. It is thus possible to apply organic and/or inorganic dyes which are soluble and/or non-soluble in the rubber polymer. Examples of suitable mineral dyes include metals in powder form, such as for instance powdered aluminium, copper, metal oxides such as for instance silicates, aluminates, titanates, iron oxides and/or hydroxides, in addition to mixtures of oxides of for instance cobalt, aluminium or zinc. White dyes are particularly suitable. Suitable organic colour pigments comprise for instance indanthrones, pyrroles and/or diazo compounds, in addition to organometallic pigments such as for instance phthalocyanines. If desired, the rubber composition can also comprise a coupling agent. Suitable coupling agents comprise silane compounds. Particularly suitable silane compounds comprise di- and tetrasulphides.

It is noted that what is described above relating to the preparation and composition of the rubber composition is also applicable to the rubber polymers applied in the constituent moulded articles. There are advantages in choosing substantially the same constituent components for the rubber composition as for the constituent components of the rubber polymers, with the proviso that the characteristics of the rubber composition must comply with the technical characteristics described in the main claim.

The invention also relates to an assembly of mutually adhered moulded articles of substantially vulcanized rubber polymers, which assembly comprises an adhesive layer of a rubber composition which comprises a peroxide with an initiating temperature lower than the vulcanization temperature of at least one of the rubber polymers. The assembly can be obtained in accordance with the method according to the invention as described at length in the foregoing. The adhesive layer preferably comprises almost no soot.

It has been found that an assembly of rubber moulded articles obtainable by means of the method according to the invention has an adhesive layer which is relatively thin. The adhesive layer is preferably as thin as possible. In a preferred embodiment of the assembly of moulded articles the adhesive layer has an average thickness of about 0.05 to 0.5 mm, and more preferably an average thickness of about 0.1 to 0.3 mm. Such thin adhesive layers ensure that the rubber-elastic properties are retained in the assembled moulded article, together with a strong adhesion. These advantages become particularly manifest when the assembly also comprises a film which is at least partially anchored between the moulded articles.

The method according to the invention is also particularly suitable for manufacturing flexible spoilers, or more generally for flexible bodywork parts of cars or other vehicles. A flexible spoiler is for instance described in the American patent applications US 2005/0012359 and in US 2005/0017541, the content of which is expressly included here in the present application. The spoiler described herein comprises an airflow-conducting element and an operating element therefor. The airflow-conducting element is attached to the bottom of the bumper, is manufactured from a rubber polymer and can be moved in and out by means of the operating element. A resilient connection between airflow-conducting element and bumper holds the spoiler in the moved-in inoperative position. The operating member can for instance take the form of a number of inflatable bellows disposed on the rear side of the spoiler. The inflatable bellows are preferably manufactured from a plastic film, in particular a foil of thermoplastic polyurethane. When the inflatable bellows are inflated, the spoiler moves forward from the moved-in position to the moved-out position. A fibre-reinforced plastic rod provides for lateral guiding of the element.

The present invention also relates to a flexible spoiler for a vehicle, comprising an airflow-conducting element of a rubber polymer, a mounting member for mounting the spoiler to the vehicle and an operating member which can move the airflow-conducting element in and out, wherein the operating member takes the form of a number of inflatable bellows of plastic film disposed on the rear side of the spoiler. According to the invention the operating member, the airflow-conducting element and the mounting member are mutually connected by means of a method at least comprising the steps of providing a rubber composition which comprises a peroxide with an initiating temperature lower than the vulcanization temperature of at least one of the rubber polymers of the airflow-conducting element and/or the mounting member; arranging an adhesive layer of the rubber composition on the surfaces for adhesion of the airflow-conducting element and/or mounting member and/or operating member; arranging at least a part of the operating member between airflow-conducting element and mounting member; bringing the surfaces for adhesion together under pressure; vulcanizing at least the adhesive layer at an increased temperature, with the proviso that the temperature is lower than the melting or degradation temperature of the film of the operating member.

The invention will now be further elucidated on the basis of the accompanying FIG. 1 and the example below, without however being limited thereto. FIG. 1 here shows a cross-section of an assembly of moulded articles obtained with the method according to the invention.

FIG. 1 more particularly shows a flexible spoiler 1 for a vehicle, of which only the lower part is shown. Spoiler 1 comprises an airflow-conducting element 11 of a rubber polymer, a mounting member 12 for mounting spoiler 1 to the vehicle and an operating member 13 which can move the airflow-conducting element 11 in and out. The moved-out position of airflow-conducting element 11 is shown in FIG. 1 by the continuous line, the moved-in position by the broken line. In the shown variant the operating member 13 takes the form of an inflatable bellows 13 of plastic film disposed on the rear side of spoiler 1. It is also possible to provide a plurality of inflatable bellows 13. When inflatable bellows 13 is inflated, the airflow-conducting element 11 moves forward from the moved-in position into the moved-out position. A fibre-reinforced plastic rod 14 provides for lateral guiding of element 11. At the position of their shared adhesion surface (indicated with AX@ in the FIGURE) operating member 13, airflow-conducting element 11 and mounting member 12 are mutually connected according to the invention by means of a particular method which is described in further detail below.

A rubber composition is first prepared in known manner by mixing in a standard kneader for about 5 minutes at an average temperature of about 90° C. The rubber composition comprises 110 parts ethylene-propylene-diene rubber (EPDM, Keltan 514 from the DSM company) and 10 parts of a peroxide-based vulcanization system. Used as peroxide is a Perkadox BC peroxide with an initiating temperature of about 105° C. The rubber composition further comprises titanium dioxide and the usual additives such as oil, zinc oxide and stearic acid. During the mixing it is ensured by controlling the temperature that the rubber composition does not vulcanize, or hardly so. The airflow-conducting element 11 and mounting member 12 comprise an almost fully vulcanized ethylene/propylene/diene rubber with a vulcanization temperature of about 160° C. Operating member 13 comprises a film of thermoplastic polyurethane rubber. Other particularly suitable films comprise films of thermoplastic elastomer and/or thermoplastic polymers. Suitable films preferably have a melting temperature above about 120° C. Arranged on the surfaces for adhesion of airflow-conducting element 11 and mounting member 12 is a thin adhesive layer of the thus prepared rubber composition with an average thickness of about 0.15 mm. Both airflow-conducting element 11 and mounting member 12 are herein situated in a vulcanizing mould which is used to vulcanize both parts. This is of course not essential to the invention, but provides for a simple application of the adhesive layer. Particularly suitable thicknesses of the adhesive layer to be applied lie between about 0.05 and 0.5 mm. The surface for adhesion of operating member 13 is provided with holes by perforating the film when it is in position, and then also applied to this portion is a small quantity of rubber composition sufficient to provide in any case the perforations with the rubber composition. The part of operating member 13 for adhesion is then arranged between airflow-conducting element 11 and mounting member 12, both of which are situated in the vulcanizing mould. The vulcanizing mould is then closed, wherein a pressure is applied to the surfaces for adhesion (indicated with AX@ in the FIGURE) so that the adhesive layer begins to flow and is then vulcanized. If desired, vulcanization can take place here at an increased temperature, with the proviso that the temperature is lower than the melting or degradation temperature of the film of operating member 13. In the example described here the vulcanization temperature amounts to about 105° C., although this may also be lower depending on the film applied and the vulcanizing system of the rubber composition. The vulcanization temperature is reached more rapidly if the mould is heated before the pressure is applied. After about 12 minutes the mould is opened and the assembled moulded article is removed from the mould. The assembled moulded article comprises an airflow-conducting element 11, mounting member 12 and operating member 13 well adhered to each other, wherein the operation and more particularly the possibility of rubber-elastic deformation are retained.

The invention claimed is:

1. Method for mutually adhering moulded articles of at least partially vulcanized rubber polymers, which method comprises at least the following steps of
   (A) providing a rubber composition which comprises a peroxide with an initiating temperature lower than the vulcanization temperature of the rubber polymers;
   (B) arranging an adhesive layer of the rubber composition on the surface of the moulded articles which are to be adhered;
   (C) bringing the surfaces for adhering together under pressure; and
   (D) vulcanizing the rubber composition of the adhesive layer at an increased temperature, with the proviso that the rubber composition is vulcanized at the position of the surfaces for adhering at a maximum set temperature that is lower than the vulcanization temperature of the rubber polymers,
   wherein the method comprises the following additional steps of:
   (E) providing a film;
   (F) arranging at least part of the film between the two surfaces prior to step (C),
   with the proviso that the temperature in step (D) is lower than the melting or degradation temperature of the film,
   and wherein the film constitutes one or more inflatable bellows of plastic film.

2. Method as claimed in claim 1, wherein the rubber polymers are substantially vulcanized.

3. Method as claimed in claim 1 wherein the rubber composition of the adhesive layer is substantially unvulcanized prior to step D).

4. Method as claimed in claim 1, wherein the rubber composition of the adhesive layer is substantially free of soot.

5. Method as claimed in claim 1, wherein the rubber composition comprises a peroxide with an initiating temperature at least 20° C. lower than the vulcanization temperature of the rubber polymers.

6. Method as claimed in claim 5, wherein the rubber composition comprises a peroxide with an initiating temperature at least 50° C. lower than the vulcanization temperature of the rubber polymers.

7. Method as claimed in claim 1, wherein the film is provided with perforations.

8. Method as claimed in claim 1 wherein the film is provided with an adhesive layer of the rubber composition.

9. Method as claimed in claim 1, wherein the film comprises a plastic film, wherein the plastic is chosen from the group of the polyesters, polyethers, polyamides, vinyl polymers, polyolefins, styrene polymers and/or thermoplastic rubbers.

10. Method as claimed in claim 1, wherein at least one of the rubber polymers and/or the rubber composition of the adhesive layer comprises an ethylene-propylene-diene rubber (EPDM).

11. Method as claimed in claim 1, wherein at least one of the rubber polymers and/or the rubber composition of the adhesive layer comprises additives chosen from the group of the cross-linkers, stabilizers, antioxidants, lubricants, fillers, dyes, pigments, flame retardants, conductive fibres, reinforcing fibres, oil and petroleum plasticizers.

12. Method as claimed in claim 1, wherein step D) is performed at a maximum set temperature of lower than 140° C.

13. Method as claimed in claim 1, wherein step D) is performed at a maximum set temperature of lower than 110° C.

* * * * *